United States Patent [19]

Weisser

[11] 4,134,526

[45] Jan. 16, 1979

[54] FILM STRIP JOINT FOR CONTINUOUS PROJECTION

[75] Inventor: Klaus Weisser, Garmisch-Partenkirchen, Fed. Rep. of Germany

[73] Assignee: Söding TV GmbH & Co., Bild & Ton International, Lockham b. Munich, Fed. Rep. of Germany

[21] Appl. No.: 833,744

[22] Filed: Sep. 16, 1977

[30] Foreign Application Priority Data

Sep. 21, 1976 [DE] Fed. Rep. of Germany ....... 2642406

[51] Int. Cl.² .............................................. G03B 1/56
[52] U.S. Cl. .................................... 226/91; 352/126; 352/235
[58] Field of Search ........................... 226/91, 92, 168; 352/235, 126–128

[56] References Cited

U.S. PATENT DOCUMENTS

| | | | |
|---|---|---|---|
| 1,655,297 | 1/1928 | Thornton | 352/235 X |
| 1,977,354 | 10/1934 | Reynolds | 352/235 UX |

*Primary Examiner*—Richard A. Schacher
*Attorney, Agent, or Firm*—Lerner, David, Littenberg & Samuel

[57] ABSTRACT

A joint for the ends of an elongated perforated film strip which is movable alongside an annularly closed guide path by a conveying means, wherein on the one end of the film strip corresponding in length substantially to that of said guide path a follower is secured which projects from the plane of the film, and wherein at the other end of said film strip a lock-in aperture is formed for free motion engagement of said follower. By reason of this free motion engagement, the film strip joint renders possible, within certain limits, to equalize length tolerances of the film strip, plus at the same time the automatic uncoupling of the film strip ends.

6 Claims, 2 Drawing Figures

U.S. Patent    Jan. 16, 1979    4,134,526
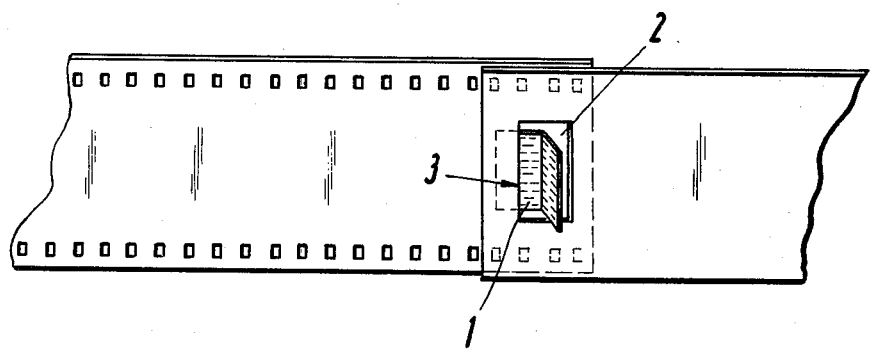
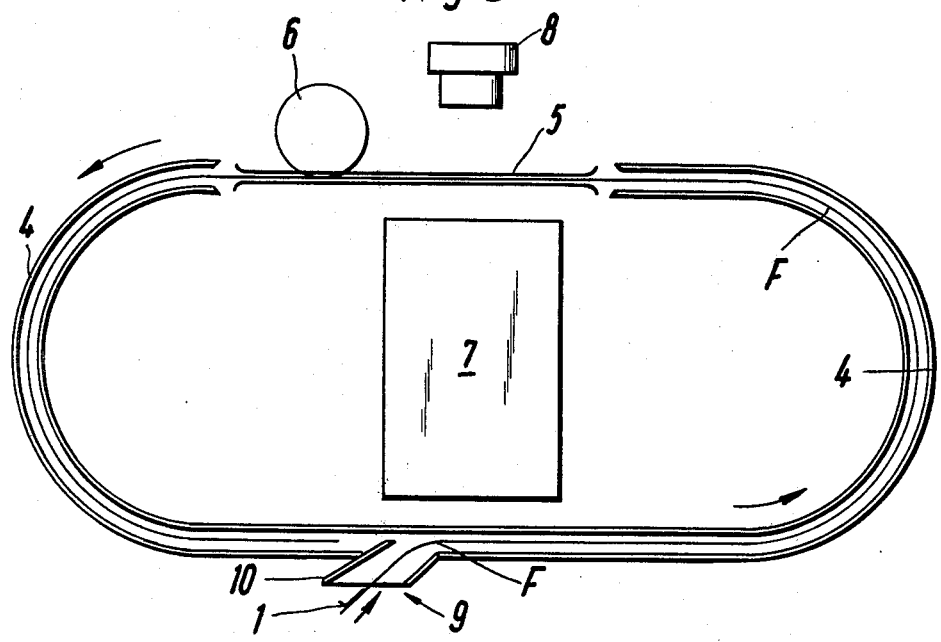

FILM STRIP JOINT FOR CONTINUOUS PROJECTION

A Film Strip Joint for Continuous Projection The invention relates to a joint for the ends of an elongated perforated film strip which is movable alongside an annularly closed guide path by means of a conveying installation for continuous projection. The film strip joint of this kind is meant to enable trouble-free and film-preserving continuous permanent projection, in particular for advertising purposes, without the need of splicing or otherwise solidly coupling the leader and trailer of the film to each other. Known projection devices operate by way of feed means engaging the perforations of the film, by annularly closed film guiding grooves and have free film strip ends not joined together. As the film strip must be held down on the film support of the projector, the conveying means thus having to overcome considerable resistance, it is impossible to ensure gripping of the free film strip leader again by the feed means without jerks. It is therefore the object of the invention to provide a film strip joint by which after each round-trip pass along the guide path the film leader is positively gripped again exactly and free of jerks by the conveying means. This object is solved in that on the one end of the film strip, corresponding in length substantially to the length of the guide path, a follower is secured which sticks out of the plane of the film, and in that at the other end of the film strip a lock-in aperture is formed for free motion engagement of the follower. By reason of this free motion engagement, the film strip joint renders possible, within certain limits, to equalize length tolerances of the film strip, plus at the same time the automatic uncoupling of the film strip ends, if the film shall be removed from the projector, due to the fact that the follower exerces no traction or compressive forces on the edges of the lock-in aperture when the joint passes round the guide path. Firstly when the joint enters the film support of the projector where the film is exposed to increased guiding resistance, the film strip end having the lock-in aperture is drawn along by the follower, so that the transition from one film strip end to the other occurs in exact manner and free of jerks. In the region of the film support and the conveying means where the film strip joint is under tensile load, so that the follower abuts one edge of the lock-in aperture, the perforations of both film strip ends are at a regular perforation pitch to each other. This is realized by a respective relative association of follower and catching edge of the lock-in aperture. Thereby, frictionless and jerk-free film strip transportation is ensured in the region of the conveying means meshing with the perforations of the film strip in the coupling section of the film strip also. The follower may be disposed on one film strip end such that the coupled film strip ends overlap. It may also jut out from the film strip end to which is is secured, so that the coupled film strip ends form a butt joint. Thereby, the length of the film strip can be further conformed to the length of the guide path of the projector. As the follower when passing along the guide path is in clearance engagement with the lock-in aperture, it is possible to disconnect the film strip joint easily, so that without much expenditure one end of the coupled film strip can be removed from the guide path by a stripper. The invention will now be explained in more detail by way of an embodiment example in accordance with the drawing.

FIG. 1 is a perspective view of a film strip joint;

FIG. 2 is a schematic representation of a film strip projector for continuous projection. FIG. 1 shows a film strip joint, wherein the ends of an elongated perforated film are joined to each other, so that the film strip forms a closed ring which can be used in a continuous projector as shown in FIG. 2. The follower 1 shown in the embodiment example of the joint is formed as an angle plate which is secured transversely to the film strip on the surface at the one end thereof, for instance by pasting. The leg projecting from the surface of the film engages, with free motion, a lock-in aperture 2 formed in the other end of the film strip, both film strip ends thus overlapping. If the film strip end appearing on the left in FIG. 1 is drawn in direction of the arrow to the left, the follower 1 contacts a catching edge 3 of aperture 2 by its leg. In this position, the follower 1 and aperture 2 are disposed relatively to each other such that the perforations of both film strip ends coincide. The projector for continuous projection of perforated film strips shown in FIG. 2 has an annularly closed guide path 4, a film support 5 located within the guide path, a conveying means 6 disposed in the projection run of the film strip at the rear of the support 5, a lamphouse 7, and a projection lens 8, which all are in known arrangement with respect to the support 5, and includes an inlet and outlet port 9 having a stripper 10 discharging into the guide path 4. The film strip F provided with the follower 1 and aperture 2 is introduced, in the uncoupled state, with its leader into the inlet and outlet port 9 and is shoved on further along the guide path 4 until the conveying means 6 engages the perforations and automatically transports the film strip onwards in the direction of the arrow. In the embodiment example, the aperture 2 is formed in the film strip leader and the follower 1 is formed at the film strip trailer. If the film strip F, conformed in length substantially to that of the guide path 4, encounters by its leader the trailer of the film strip in the region of the inlet and outlet port 9, then the follower 1 projecting upwardly in the Figure engages the aperture 2. As the aperture 2 is formed much larger than the follower 1, this enables length tolerance equalization of the film strip length in respect to the length of the guide path. Inasmuch as the follower with regard to the aperture has free motion also transversely to the film strip direction, this ensures safe engagement. The coupled film strip F is advanced by the conveying means in direction of the arrow without any traction or compressive forces at the joint worth mentioning. However, this condition at the joint changes, once the film strip joint has reached the film support 5. There, the film strip is guided more accurately than along the guide path, which goes along with increased frictional resistance during the passage of the film strip. The film strip leader lying in the rear when viewed in direction of the arrow is thus pulled through the support 5 without any jerk by the conveying means 6, together with the trailer of the film strip carrying the follower 1 which now force-lockingly abuts the catching edge 3 of the aperture 2. Since in that position of the joint the perforations of the film strip ends coincide, the joint passes the conveying means 6 frictionless without any difficulty. In direction of the arrow behind the conveying means 6 and support 5, respectively, the film strip joint is free of stress again. For removal of the film strip from the projector, the direction of rotation of the conveying means 6 is inversed. The film strip F then runs opposite to the direction of the arrow, the operations being exactly the reverse of the introduction of the film. If the film strip joint which, outside the film support 5, transmits no force even under reverse winding, reaches the region of the inlet and outlet port 9, then the stripper 10 steers the trailer of the film strip carrying the follower 1 (FIG. 2) downwardly out of port 9; the joint is disconnected and the film strip can be removed from the projector with the help of the conveying means and/or by pulling it by hand.

I claim:

1. A joint for connecting the ends of an elongated perforated film strip into a closed loop which is movable along an annular closed guide path by a conveying means, said joint being characterized in that on the one end of the film strip, corresponding in length substantially to that of said guide path, a follower is secured which projects substantially vertically from the plane of said film, and in that at the other end of said film strip a lock-in aperture is formed for the purpose of allowing free motion engagement of said follower with said aperture.

2. A joint according to claim 1, wherein upon abutment of said follower to the front catching edge of said lock-in aperture the perforations of both film strip ends are at a regular perforation pitch with respect to each other.

3. A joint according to claim 1, wherein said follower is a pin and said lock-in aperture is a circular hole.

4. A joint according to claim 1, wherein said follower comprises a rigid right angle member and said lock-in aperture is a rectangular hole.

5. A joint according to claim 1 wherein said follower juts out from one end of said film strip and wherein the coupled film strip ends form a butt joint.

6. A joint according to claim 1, wherein one end of said film strip is leadable out of said guide path by a stripper.

* * * * *